United States Patent
Jönsson et al.

(10) Patent No.: US 9,249,886 B2
(45) Date of Patent: Feb. 2, 2016

(54) PRESSURE RESISTANT STATIC AND DYNAMIC SEAL ASSEMBLY AND METHOD

(71) Applicants: Sven Anders Jönsson, Stehag (SE); Yefim Epshetsky, Schaumburg, IL (US); Bryan Uncapher, Grayslake, IL (US)

(72) Inventors: Sven Anders Jönsson, Stehag (SE); Yefim Epshetsky, Schaumburg, IL (US); Bryan Uncapher, Grayslake, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 49 days.

(21) Appl. No.: 14/366,956

(22) PCT Filed: Dec. 14, 2012

(86) PCT No.: PCT/US2012/069729
§ 371 (c)(1),
(2) Date: Jun. 19, 2014

(87) PCT Pub. No.: WO2013/096117
PCT Pub. Date: Jun. 27, 2013

(65) Prior Publication Data
US 2014/0374993 A1    Dec. 25, 2014

Related U.S. Application Data

(60) Provisional application No. 61/577,440, filed on Dec. 19, 2011.

(51) Int. Cl.
| | |
|---|---|
| F16J 15/44 | (2006.01) |
| F16J 15/42 | (2006.01) |
| F16J 15/16 | (2006.01) |
| F16J 15/34 | (2006.01) |
| F16J 15/32 | (2006.01) |

(52) U.S. Cl.
CPC .............. *F16J 15/42* (2013.01); *F16J 15/164* (2013.01); *F16J 15/3204* (2013.01); *F16J 15/346* (2013.01); *F16J 15/3444* (2013.01); *F16J 15/445* (2013.01)

(58) Field of Classification Search
CPC ......... F16J 15/44; F16J 15/441; F16J 15/443; F16J 15/445; F16J 15/164
See application file for complete search history.

(56) References Cited

U.S. PATENT DOCUMENTS

| | | | | |
|---|---|---|---|---|
| 3,797,899 A | * | 3/1974 | Anderson | F16C 33/7889 277/433 |
| 4,817,966 A | * | 4/1989 | Borowski | F16J 15/164 277/366 |
| 5,378,000 A | * | 1/1995 | Orlowski | F16J 15/164 277/311 |
| 2001/0002742 A1 | * | 6/2001 | Orlowski | F16J 15/4478 277/361 |
| 2006/0091612 A1 | * | 5/2006 | Anderberg | F16J 15/002 277/411 |
| 2014/0001707 A1 | * | 1/2014 | Epshetsky | F16J 15/164 277/433 |

* cited by examiner

*Primary Examiner* — Gilbert Lee
(74) *Attorney, Agent, or Firm* — Mark Ussai; SKF USA Inc. Patent Dept.

(57) ABSTRACT

A seal assembly includes a stator attached to a housing and a rotor attached to a shaft. A static sealing member is attached to the stator presenting a contact with the rotor at stand-still. An electromagnetic is attached to the stator at a distance from an end of the static sealing member. The static sealing member is activated and moved away from the rotor by the magnetic force exerted by the electromagnet as the shaft rotates. The electromagnet is controlled by a control system for controlling the equipment in which the bearing isolator is used. To deactivate the static sealing member during shaft rotation, the bearing isolator may have its own control system with a sensor to indicate if the shaft is rotating. As the shaft rotates, contaminants are expelled through gaps between the stator and the rotor.

24 Claims, 3 Drawing Sheets

PRESSURE RESISTANT STATIC AND DYNAMIC SEAL ASSEMBLY AND METHOD

FIELD OF THE INVENTION

The present invention relates to seal assemblies, and more specifically to the seal assemblies with sealing members movable between static and dynamic sealing positions.

BACKGROUND OF THE INVENTION

Bearings and mechanical seals have been used in various industrial applications for years. A bearing isolator is one of the components of these bearings and mechanical seals. There is a close relationship between the life of these two critical components. The failure of a mechanical seal may cause the bearings to fail and poor bearing conditions can reduce seal life. The failure of the mechanical seal results typically because of rain, product leakage, debris, and wash-down water entering the bearing housing thereby resulting in contamination of bearing lubricant, which negatively impacts lifespan of the bearings and mechanical seals.

Elastomeric lips and O-rings are used in the mechanical seals to prevent rain, product leakage, debris, and wash-down water from entering into the bearing housing of these mechanical seals thereby avoiding quick wear and tear of these elastomeric lips and the O-rings. In reality, it is very hard and almost impossible to prevent dust and exterior contaminants from entering into the interior of the bearing housing. To prevent the ingress of corruption and the egress of lubricating fluids, a number of auxiliary or improved primary sealing arrangements and devices have been provided and used in prior art sealing applications.

One such type of a seal assembly, commonly referred to as an expeller seal assembly, includes two annular, elastomeric sealing members disposed within separate annular cavities of a rotor mounted on a shaft. A stator is partially disposed between the two rotor cavities and has a central bore which defines a clearance space about the shaft. At a static sealing position, each sealing member is disposed generally against a rotor outer circumferential surface and against an adjacent radial surface on each axial end of the stator, such that the clearance space is substantially sealed at each end. When the shaft rotates, the two sealing members are pulled by frictional engagement with the rotor surface to rotate with the shaft, until centrifugal forces cause each sealing member to deflect radially outwardly from the rotor outer surface and from the stator surface. At this point, sealing in the clearance space is accomplished by a pressure differential generated by the rotation of the rotor, and the disengagement of the seal from the stator both reduces wear on the sealing members and reduces friction in the seal assembly.

However, until the rotor and sealing members reach a rotational speed sufficient to deflect the sealing members into contact with an inner circumferential surface of the rotor, such that the sealing members are again rotationally coupled with the rotor, the sealing members will lose angular momentum and deflect inwardly due to the diminished centrifugal force and return to the inner, static sealing position.

Thus, the sealing members will oscillate between the inner, static sealing position and a non-contact position until reaching a sufficient "hold-off" speed at which the sealing members remain rotationally coupled with the rotor. Also, whenever the shaft speed decreases below the hold-off speed, the sealing members will again begin to oscillate into and out of contact with the stator. As such, this oscillatory motion of the sealing members tends to increase wear and increase friction within the seal assembly.

Another type of seal is a labyrinth device which contains a tortuous path that makes it difficult for contaminants to enter the bearing housing to degrade lubricant effectiveness. The advantages of labyrinths are their non-wearing and self-venting features. Some of these commercially successful seal devices do not require any actual physical inter engagement of the sealing member parts. The disadvantages of labyrinth seal devices include higher initial costs than lip seals, and the existence of an open path to the atmosphere that can allow the contamination of the lubricant by atmospheric condensate as the housing chamber breathes during temperature fluctuations in humid environments when the equipment cycles on and off.

Therefore, an opportunity exists for improved bearing isolators having a seal member with improved life span and a unique design that will allow smaller particles or contaminants and fluids to be expelled from gaps defined between the rotor member and the stator member the same way as they entered by the expelling function of the pumping action in dynamic operations but are stopped by the sealing member when the bearing isolator is in a static condition.

Still another opportunity exists for improved bearing isolators having a seal member wherein the function and shape of the seal member can be controlled whether the rotor member and the stator member are rotatable relative one another or not.

SUMMARY OF THE INVENTION

An apparatus of the present invention presents a shaft sealing assembly (the assembly) for static and dynamic sealing in various bearing and mechanical sealing applications. The assembly includes a stator member that is attached to a housing and a rotor member that is attached to a shaft rotatable about an axis. The rotor member includes a first expeller member presenting a plurality of radial protrusions separated by a plurality of recesses and a second expeller member attached to the shaft.

A static sealing member is attached to the stator member. The static sealing member presents a core portion and a pair of radial lips extending from the core portion with one of the lips extending from one distal end of the core portion wherein another distal end terminates into a third lip. The stator member presents an annular wall extending to inner walls inclined conically to a front wall extending parallel to the annular wall and a central radial rim or flange extending from the front wall to the rotor member. The front wall receives the radial lips of the static sealing member extending generally perpendicular to the front wall and extending generally parallel to the radial rim wherein the core portion of the static sealing member extends generally parallel to the second expeller member of the rotor member connected to the shaft.

An electromagnet is attached to the stator member at the radial flange. At specific time before, at the moment or after the shaft starts to rotate the static sealing member is activated and moved away from the rotor member by the magnetic force created on the static sealing member by the electromagnet. The electromagnet is controlled by an existing control system for controlling any type equipment in which bearing isolator is used. If the static sealing member needs to be deactivated at or after the moment the shafts starts to rotate, the bearing isolator could have its own control system where a sensor is used to indicate if the shaft is rotating or not. The sensor could be placed outside or inside the bearing isolator.

Fluid passages are defined between the rotor member and the stator member designed with an angle and rotor features that create a pumping action. These fluid passages stop larger contaminants to enter and pass the assembly in dynamic and static operation. Smaller particles or contaminants and fluids are expelled from the fluid passages the same way as they entered by the expelling function of the pumping action in dynamic operations. In static conditions fluid and contaminants could enter the fluid passages but are stopped by the static sealing member.

As soon as the shaft starts to rotate, the contaminants are expelled out through the gaps. The free end or the third lip of the static sealing member, as it is in static conditions, contacts with an angled surface of the second expeller member of the rotor member but a gap is created in dynamic conditions, as the shaft starts to rotate thereby disengaging the third lip from the second expeller member as the static sealing member moved away from the second expeller member to the flat wall of the stator member thereby disengaging the third lip from the angled surface of the second expeller member of the rotor member.

An advantage of the present invention is to provide the improved shaft sealing assembly for static and dynamic sealing of the shaft system thereby replacing prior art bearing isolators having static sealing members like O-rings that are activated only by centrifugal force during acceleration and placed in the rotor.

Another advantage of the present invention is to provide an improved static sealing member placed in the stator member of the bearing isolator, wherein the static sealing member is made of magnetic rubber compound adaptable to become deactivated and activated by an electromagnet placed in the stator member and controlled by an external control system.

Still another advantage of the present invention is to provide an improved static sealing member wherein any undesired periods of contact between the stator member and the static sealing member can be regulated therefore extending the bearing isolator life.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
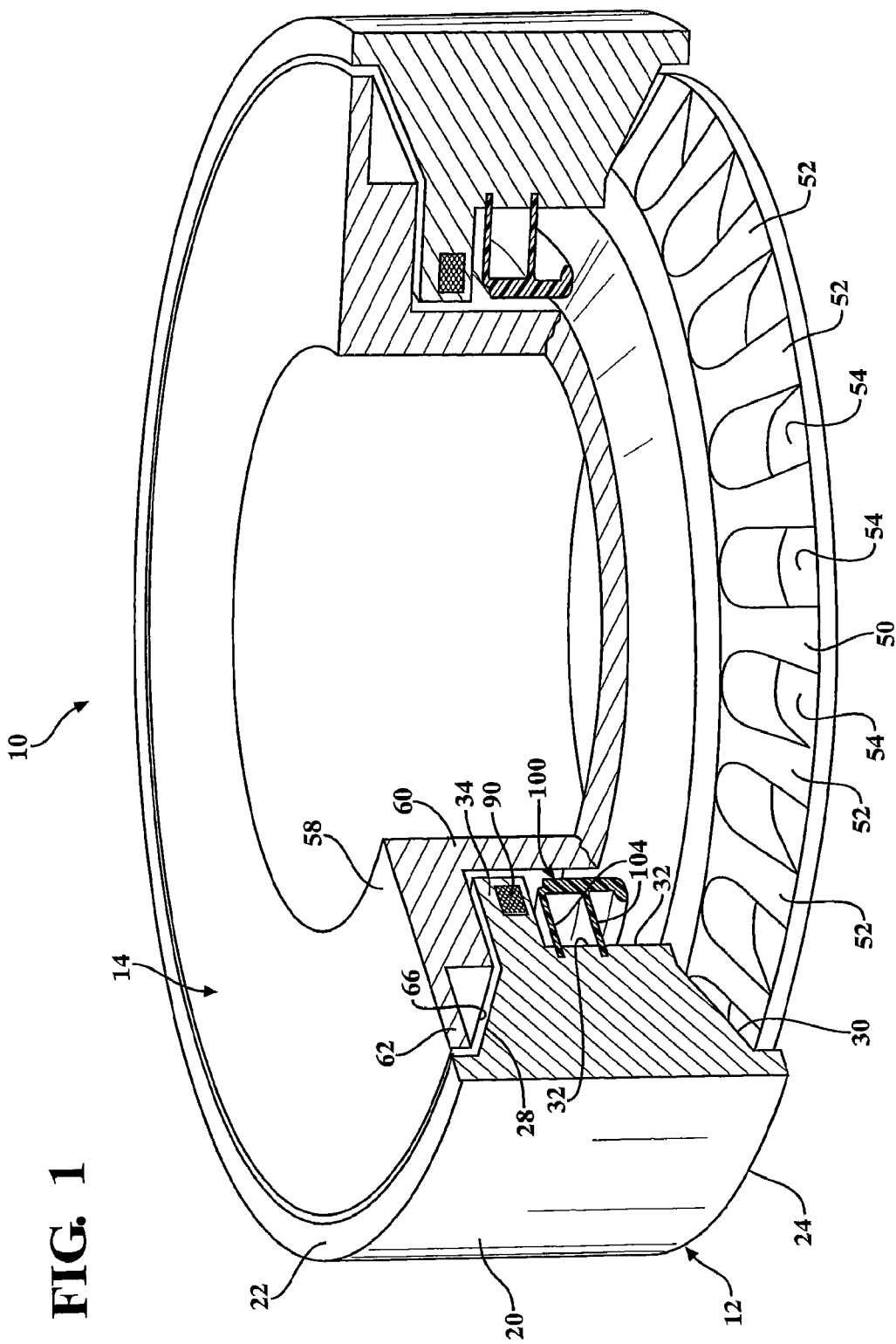
FIG. 1 illustrates a perspective and partially in section view of a shaft sealing assembly (the assembly) for static and dynamic sealing of a shaft of the present invention.

Referring to FIGS. 1 through 4, wherein like numerals indicate like or corresponding parts throughout the several views, a shaft sealing assembly (the assembly) for static and dynamic sealing of a shaft of the present invention is generally shown at 10. The words "inner", "inwardly" and "outer", "outwardly" refer to directions toward and away from, respectively, a designated centerline or a geometric center of an element being described, the particular meaning being readily apparent from the context of the description. The assembly 10 has numerous applications including and not limited to sealing vehicular engine crankshafts, transmission shafts, bearing lubrication systems, compressor shaft support assemblies, and the like, without limiting the scope of the present invention.

The assembly 10 is used for static and dynamic sealing applications in various bearings and mechanical sealing solutions. The assembly 10 includes of a stator member, generally indicated at 12, that is attached to a housing or any other worksurface (not shown) and a rotor member, generally indicated at 14, attached to a shaft 16 rotatable about an axis A. The stator member 12 presents an annular wall 20 extending to upper and lower side walls 22 and 24 and further inclined outwardly from the annular wall 20 to form inclined walls 28 and 30 and further extending into a front wall 32 extending generally parallel to the annular wall 20 and radial rim or flange 34 extending generally perpendicular to the annular wall 20. The front wall 32 and the radial rim 34 form a corner section. The radial rim 34 is terminated into inner edge 36 extending parallel to the annular wall 22 and the axis A. The radial rim 34 is adjacent the rotor member 14. The stator member 12 may also include a groove (not illustrated) defined therein to receive an O-ring or seal (not illustrated) disposed therein to seal the stator member 12 against the housing or the worksurface. The stator member 12 is formed from metals, metals alloys, and any other rigid material without limiting the scope of the present invention. The stator member 12 can be stamped or injection molded.

The rotor member 14 includes a first expeller rotor 50 presenting a plurality of radial protrusions 52 separated by a plurality of recesses 54 and inlets (not shown) defined therein and extending through the first expeller 50. A second expeller rotor 58 is attached to the shaft 16. The second expeller rotor 58 include a tubular body 60 having upper and lower radial flanges 62 and 64. The upper and lower radial flanges 62 and 64 include inclined walls 66 and 68 extending parallel the inclined walls 28 and 30 thereby forming fluid passages 70 and 72.

The upper radial flange 62 further includes first and second and third inner walls 80, 82, and 84. The first inner wall 80 extends from the inclined wall 66 to the axis A and generally perpendicular to the axis A and the second inner wall 82 extends from the first inner wall 80 and extends parallel the shaft and the front wall 32 of the stator member 12. The third inner wall 84 extends from the second inner wall 82 and is inclined to connect with the inclined wall 68. The radial flange 34 is adjacent the first and second inner walls 80 and 82 of the second expeller rotor 58. The rotor member 14 is formed from metals, metals alloys, and any other rigid material without limiting the scope of the present invention. The rotor member 14 can be stamped or injection molded.

Figure 2:
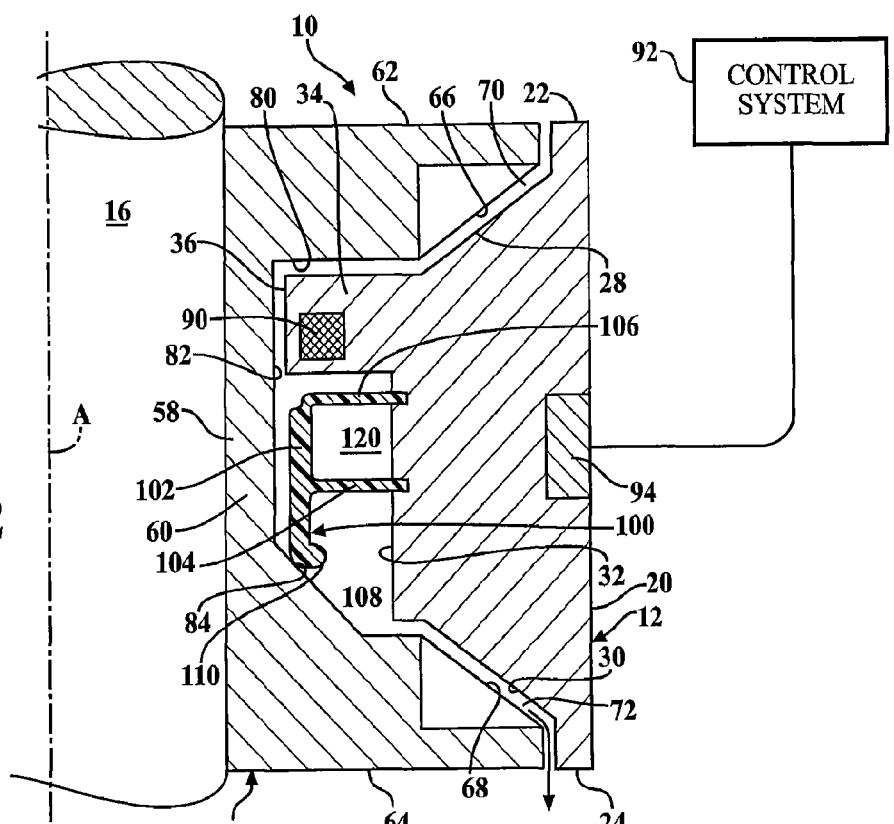
FIG. 2 illustrates an enlarged cross sectional view of the embodiment of the assembly for static and dynamic sealing of the shaft of FIG. 1 with a sealing member shown in a static position.
Figure 3:
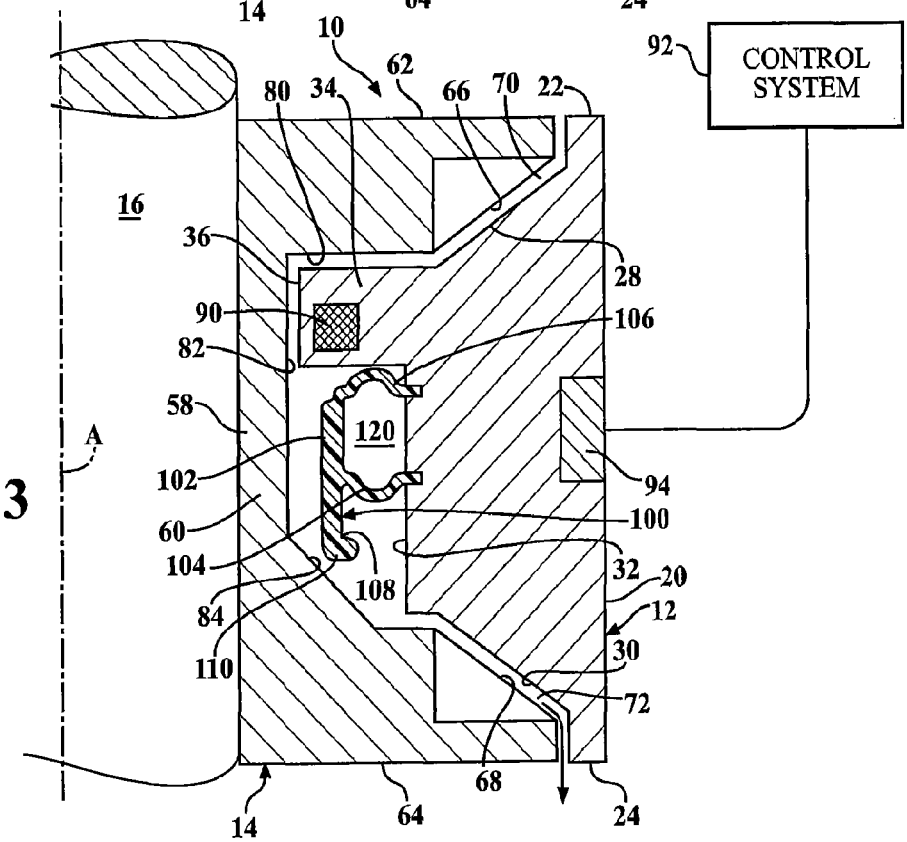
FIG. 3 illustrates an enlarged cross sectional view of the assembly for static and dynamic sealing of the shaft of FIG. 1 with a sealing member shown in a dynamic position.
Figure 4:
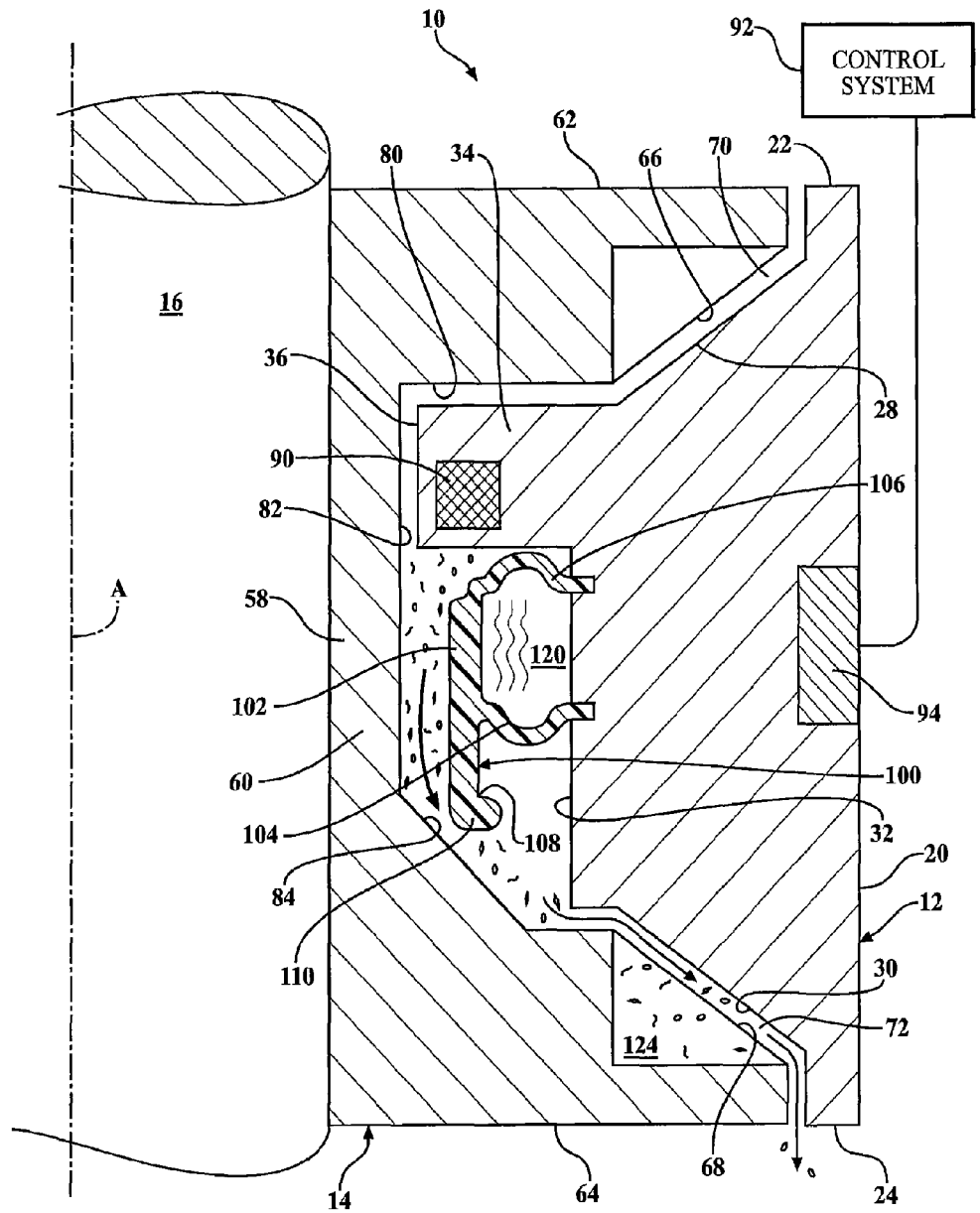
FIG. 4 illustrates a partially enlarged cross sectional view of the assembly with a sealing member connected a stator member wherein the sealing member moves between a first position, as the sealing member is in the static stage contacting a rotor member, and the dynamic position, as the sealing member moves away from the rotor member.

At least one electromagnet device 90 is attached to the stator member 12 at the radial rim 34. The electromagnet device 90 is controlled by an existing control system 92 for controlling any type equipment in which the assembly 10 is used. A bearing isolator (not shown) could have its own control system (not illustrated) where a sensor 94 is used to indicate if the shaft 16 is rotating or not. The sensor 94 could be placed outside or inside the bearing isolator. FIGS. 2 through 4 show a location of the sensor 94 and are not intended to limit the scope of the present invention.

A least one static sealing member, generally indicated at 100, is attached to the front wall 32. The static sealing member 100 can be molded to the front wall 32 or engaged by any mechanical means without limiting the scope of the present invention. The static sealing member 100 presents a core portion 102 and a pair of radial lips 104 and 106 extending radially from the core portion 102 with one of the lips 104 extending from one distal end of the core portion 102 wherein another distal end 108 terminates into a third lip 110. The static sealing member 100 is formed from resilient elastomeric materials with metal particles or powder mixed therein. In particular, the elastomeric material is made of magnetic rubber compound adaptable to become deactivated and activated by the electromagnet device 90 placed in the stator member 12 and controlled by the external control system.

Alternatively, the static sealing member 100 is formed from resilient elastomeric materials without metal particles or powder mixed therein. Here, the static sealing member 100 moves between the static position and the dynamic position as the rotor member 14 rotates about the stator member 12 thereby moving the static sealing member 100 under effect of centrifugal force generated during rotation of the rotor member 14. The third lip 108 contacts and frictionally engages with the third wall 84 of the second expeller rotor 58 of the rotor member 14 is at stand-still or static position. The cross section of the core portion 102 is wider than the cross section of the lips 106 and 104 to allow the lips 104 and 106 to flex under the pressure from the core portion 102 and centrifugal force generated by the rotational motion of the rotor member 14 as the shaft 16 starts rotating about the axis.

As best shown in FIG. 4, during rotational motion of the shaft 16, the electromagnet device 90 is activated thereby attracting the lip 106 close to the central rim 34. In addition, centrifugal force generated in response to rotational force of the rotor member 14, pushes the static sealing member 100 away from the second and third inner walls 82 and 84 of the second, expeller rotor 58 thereby moving the static sealing member 100 close to the central rim 34 and the front wall 32 and away from the second and third inner walls 82 and 84 to reduce space 120 between the core portion 120 and the front wall 32 thereby allowing smaller particles, contaminants, and fluids, as shown at 124, to expelled from one of the fluid passages 70 and 72 the same way they entered by the expelling function of the pumping action in dynamic operations.

In static conditions fluid and contaminants 124 could enter the fluid passages 70 and 72 but are stopped by the static sealing member 100. As soon as the shaft 16 starts to rotate, the contaminants 124 are expelled out through at least one of the fluid passages 70 and 72. Orientation of the central rim 34 as shown in FIGS. 1 through 4, is not intended to limit the scope of the present invention. The stator member 12 and the rotor member 14 may be positioned in a different orientation wherein the central rim 34 on the bottom side of the assembly 10.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A seal assembly functionally interposed between a housing and a shaft rotatable about an axis and extending through the housing for providing a seal between the shaft and the housing, said seal assembly comprising:
a stator member attached to the housing;
a rotor member attached to the shaft and rotatable about the axis with the shaft and relative said stator member defining fluid passages therebetween; and
at least one sealing member connected to said stator member and movable between a static position with said at least one sealing member frictionally engaging said rotor member to define an enclosed pocket portion fluidly communicated with said fluid passages and defined between said rotor member and said stator member and a dynamic position as said at least one sealing member moves away from said rotor member and to said stator member in response to centrifugal force generated from said rotor member rotatable about the axis thereby forcing said at least one sealing member away from said rotor member to allow contaminants to leave said seal assembly through said fluid passages.

2. A seal assembly as set forth in claim 1, wherein said at least one sealing member presents a core portion and a pair of radial lips extending radially from said core portion with one of said lips extending from one distal end of said core portion and another distal end terminating into a third lip.

3. A seal assembly as set forth in claim 2, wherein said at least one sealing member is formed from resilient elastomeric materials.

4. A seal assembly as set forth in claim 3, wherein said stator member presents an annular wall extending to upper and lower side walls and further inclined outwardly from said annular wall to form inclined walls and further extending into a radial flange extending generally perpendicular to said annular wall and a front wall extending from said radial flange to one of said inclined walls.

5. A seal assembly as set forth in claim 4, wherein said radial flange is terminated into inner edge extending parallel to said annular wall and the an axis (A) of the seal assembly.

6. A seal assembly as set forth in claim 5, including at least one electromagnet device connected to said radial flange adaptable to be activated in order to magnetically attract said at least one sealing member at said dynamic position of said at least one sealing member as said rotor member starts rotating about the axis wherein said radial lips extend from a planar position to a non-planar position extending to said radial rim and decreasing distance between said core portion of said at least one sealing member and said front wall of said stator member to allow the contaminants to leave said seal assembly through said fluid passages.

7. A seal assembly as set forth in claim 6, wherein said rotor member includes a first expeller rotor presenting a plurality of radial protrusions separated by a plurality of recesses.

8. A seal assembly as set forth in claim 7, including a second expeller rotor attached to the shaft and presenting a tubular body having upper and lower radial flanges including inclined walls extending parallel said inclined walls of said stator member thereby forming said fluid passages.

9. A seal assembly as set forth in claim 8, wherein said upper radial flange further includes first and second and third inner walls with said first inner wall extending from said inclined wall to the axis and generally perpendicular to the axis and said second inner wall extending from said first inner wall and parallel to the shaft and said front wall of said stator member.

10. A seal assembly functionally interposed between a housing and a shaft rotatable about an axis and extending through the housing for providing a seal between the shaft and the housing, said seal assembly comprising:
- a stator member attached to the housing;
- a rotor member including at least one electromagnet device and attached to the shaft and rotatable about the axis with the shaft and relative said stator member, defining fluid passages therebetween; and
- at least one sealing member presenting a core portion and a pair of radial lips extending radially from said core portion with one of said lips extending from one distal end of said core portion and another distal end terminating into a third lip connected to said stator member and movable between a static position with said at least one sealing member frictionally engaging said rotor member to define an enclosed pocket portion fluidly communicated with said fluid passages and a dynamic position as at least one sealing member moves away from said rotor member and toward said stator member in response to centrifugal force generated from said rotor member rotatable about the axis and magnetic force of said at least one electromagnet device thereby forcing said at least one sealing member away from said rotor member to allow contaminants to leave said seal assembly through said fluid passages.

11. A seal assembly as set forth in claim 10, wherein said sealing member is formed from resilient elastomeric materials.

12. A seal assembly as set forth in claim 11, wherein said stator member presents an annular wall extending to upper and lower side walls and further inclined outwardly from said annular wall to form inclined walls and further extending into a radial flange extending generally perpendicular to said annular wall and a front wall extending from said radial flange to one of said inclined walls.

13. A seal assembly as set forth in claim 12, wherein said radial flange is terminated into inner edge extending parallel to said annular wall and an axis (A) of the seal assembly.

14. A seal assembly as set forth in claim 13, wherein said least one electromagnet device connected to said radial flange adaptable to be activated in order to magnetically attract said sealing member at said dynamic position of said sealing member as said rotor member starts rotating about the axis wherein said radial lips extend from a planar position to a non-planar position extending to said radial rim and decreasing distance between said core portion of said sealing member and said front wall of said stator member to allow the contaminants to leave said seal assembly through said fluid passages.

15. A seal assembly as set forth in claim 14, wherein said rotor member includes a first expeller rotor presenting a plurality of radial protrusions separated by a plurality of recesses.

16. A seal assembly as set forth in claim 15, including a second expeller rotor attached to the shaft and presenting a tubular body having upper and lower radial flanges including inclined walls extending parallel said inclined walls of said stator member thereby forming said fluid passages.

17. A seal assembly as set forth in claim 16, wherein said upper radial flange further includes first and second and third inner walls with said first inner wall extending from said inclined wall to the axis and generally perpendicular to the axis and said second inner wall extending from said first inner wall and parallel to the shaft and said front wall of said stator member.

18. A method of forming a pressure resistant static and dynamic seal interposed between a housing and a shaft rotatable about an axis and extending through the housing, said method comprising the steps of:
- connecting a stator member attached to the housing with a rotor member attached to the shaft to define fluid passages therebetween;
- connecting a sealing member to the stator member; and
- rotating the rotor member about the axis relative the stator member to move the sealing member between a static position as the sealing member frictionally engages the rotor member to define an enclosed pocket portion fluidly communicated with the fluid passages and a dynamic position as the sealing member moves away from the rotor member and to the stator member in response to centrifugal force generated from the rotor member rotatable about the axis to force the sealing member away from the rotor member to allow contaminants to leave the seal assembly through the fluid passages.

19. A method as set forth in claim 18, including the step of forming the sealing member to present a core portion and a pair of radial lips extending radially from the core portion with one of the radial lips extending from one distal end of the core portion and another distal end terminating into a third lip.

20. A method as set forth in claim 19, including the step of forming the sealing member from resilient elastomeric materials.

21. A method as set forth in claim 20, including the step of forming the stator member to define an annular wall extending to upper and lower side walls and further inclined outwardly from the annular wall to form inclined walls and further extending into a radial flange extending generally perpendicular to the annular wall and a front wall extending from the radial flange to one of the inclined walls.

22. A method as set forth in claim 21, including the step of connecting least one electromagnet device to the radial flange to magnetically attract the sealing member at the dynamic position of the sealing member as the rotor member starts rotating about the axis wherein the radial lips extend from a planar position to a non-planar position extending to the radial rim and decreasing distance between the core portion of the sealing member and the front wall of the stator member to allow the contaminants to leave the seal assembly through the fluid passages.

23. A method as set forth in claim 22, including the step of forming the rotor member from a first expeller rotor presenting a plurality of radial protrusions separated by a plurality of recesses defined therein and extending through the first expeller.

24. A method as set forth in claim 23, wherein the step of forming the rotor member further includes the step of forming a second expeller rotor to be attached to the shaft wherein the second expeller rotor is formed to include a tubular body having upper and lower radial flanges including inclined walls extending parallel the inclined walls of the stator member thereby forming the fluid passages.

* * * * *